United States Patent [19]
Matsch

[11] 3,759,498
[45] Sept. 18, 1973

[54] LIQUID-GAS CONTACT TRAY
[75] Inventor: Ladislas C. Matsch, Amherst, N.Y.
[73] Assignee: Union Carbide Corporation, New York, N.Y.
[22] Filed: Mar. 16, 1970
[21] Appl. No.: 19,676

[52] U.S. Cl. .......................................... 261/114 JP
[51] Int. Cl. .............................................. B01f 3/04
[58] Field of Search ..................... 261/114, 114 UT, 261/114 JP, 114 A, 113; 202/158

[56] References Cited
UNITED STATES PATENTS

| | | | |
|---|---|---|---|
| 1,738,870 | 12/1929 | Cox et al. ........................ | 261/114 X |
| 2,568,749 | 9/1951 | Kittel ................................ | 261/113 |
| 2,759,720 | 8/1956 | Kittel ................................ | 261/114 |
| 2,772,080 | 11/1956 | Huggins et al. ...................... | 261/114 |
| 2,784,953 | 3/1957 | Ng ..................................... | 261/114 |
| 2,787,453 | 4/1957 | Hibshman et al. .................. | 261/114 |
| 2,853,281 | 9/1958 | Hibshman et al. .................. | 261/114 |
| 2,963,872 | 12/1960 | Latimer ........................... | 261/114 X |
| 3,062,517 | 11/1962 | Voetter et al. ..................... | 261/114 |
| 3,282,576 | 11/1966 | Bruckert et al. ..................... | 261/114 |
| 3,417,975 | 12/1968 | Williams et al. .................... | 261/114 |
| 3,467,365 | 9/1969 | Webster ............................. | 261/114 |

FOREIGN PATENTS OR APPLICATIONS

| | | | |
|---|---|---|---|
| 497,599 | 9/1950 | Belgium ............................ | 261/114 |
| 1,237,299 | 6/1960 | France ........................... | 261/114 UT |
| 669,862 | 4/1952 | Great Britain ................. | 261/114 JP |

Primary Examiner—Frank W. Lutter
Attorney—Paul A. Rose, Harrie M. Humphreys, John C. Le Fever and Lawrence G. Kastriner

[57] ABSTRACT

A slotted sieve tray in which the slot density varies across the active surface and the slots are oriented with respect to the tray diametral streamline so as to overcome fluid maldistribution problems which occur on large diameter trays.

10 Claims, 7 Drawing Figures

PATENTED SEP 18 1973

INVENTOR
LADISLAS C. MATSCH
BY John C. Ledua
ATTORNEY

INVENTOR
LADISLAS C. MATSCH
BY
John C. Lotner
ATTORNEY

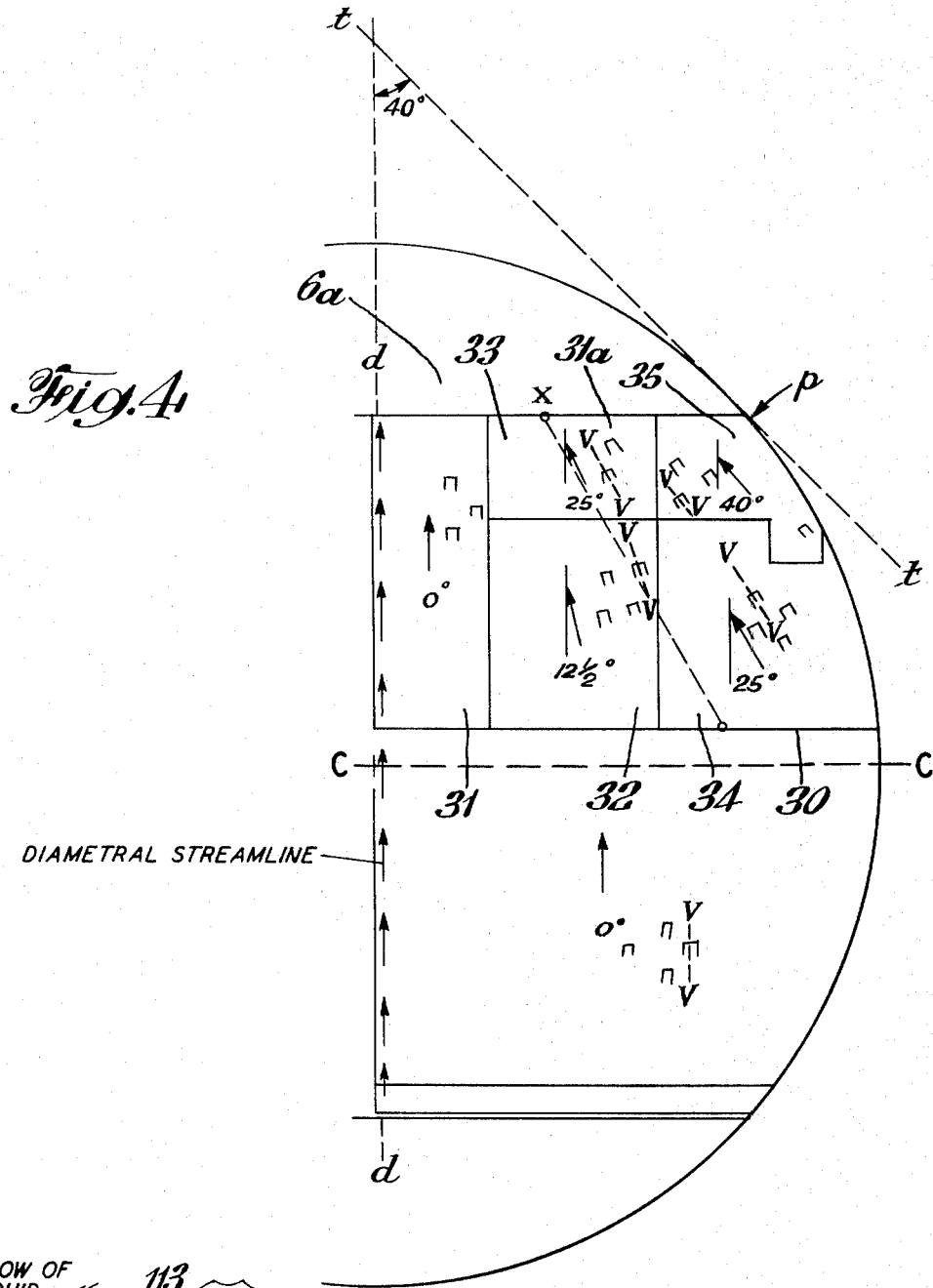
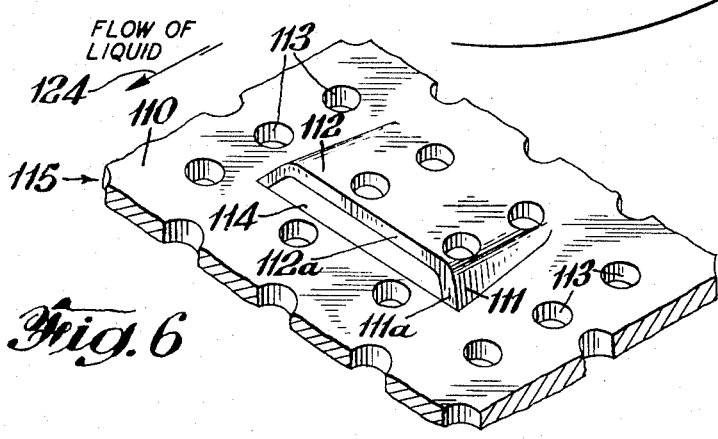

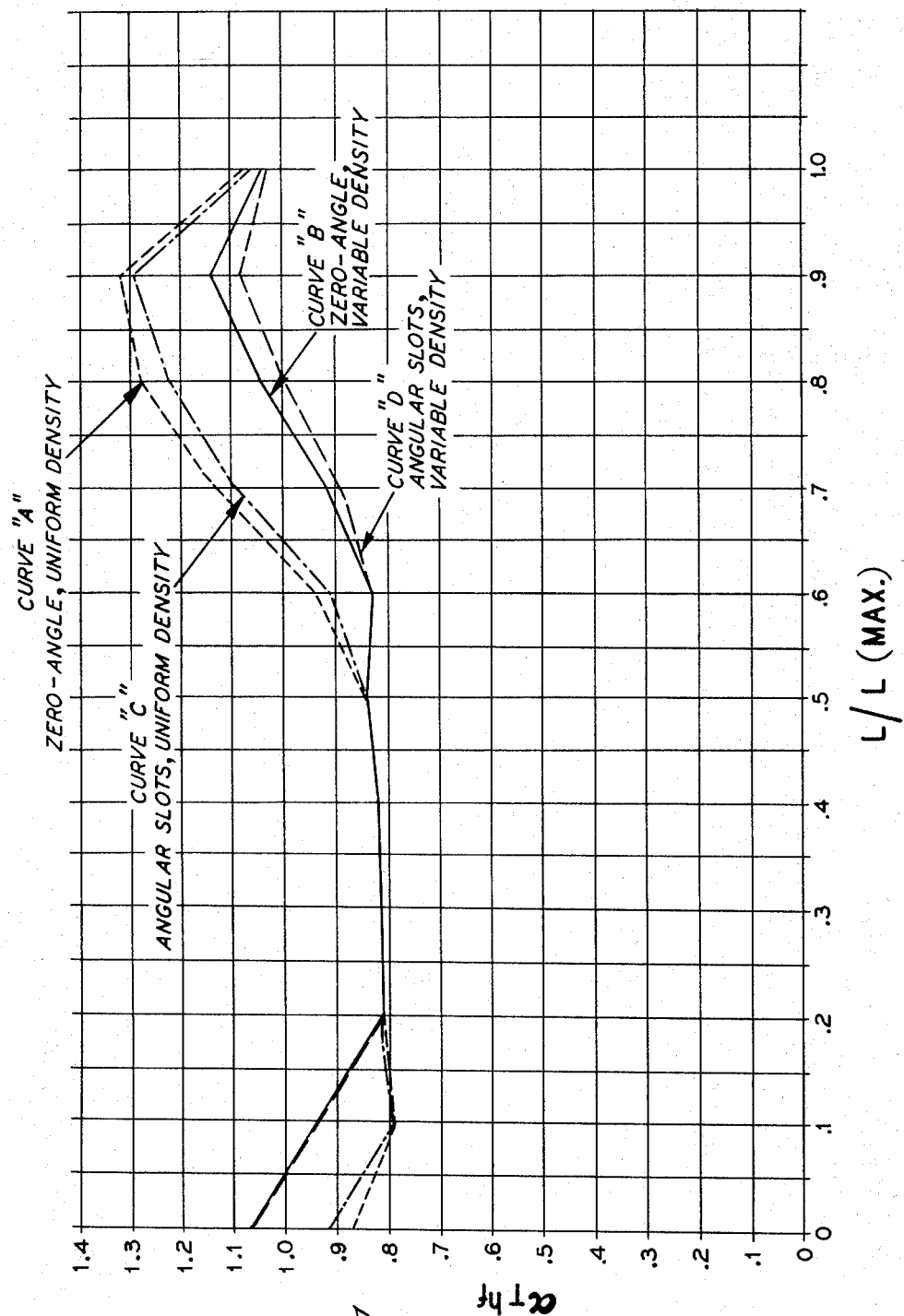

1

LIQUID-GAS CONTACT TRAY

BACKGROUND OF THE INVENTION

This invention relates to an improved gas-liquid contacting tray of the type used in distillation and absorption systems for mass transfer between the two fluids.

U.S. Pat. No. 3,417,975 to B. Williams and E. F. Yendall describes a gas-liquid contact tray employing a uniform pattern of fixed size openings with walls normal to the tray surface and a uniform pattern of obliquely inclined openings, the latter being oriented in the downstream direction of liquid flow. Trays designed in accordance with the Williams et al patent (hereinafter referred to as slotted sieve trays) perform with improved efficiency owing to the elimination of longitudinal hydraulic gradient in the liquid on the tray. The additional degree of design freedom afforded by two sets of fixed apertures results in the utilization of only a predetermined, appropriate fraction of the total available vapor thrust to accomplish liquid transport across the tray. Other factors being equal, the neutralization of the hydraulic gradient now produces uniform resistance to vapor penetration through the liquid depth on the tray, and both vapor and liquid flows are uniformly distributed over the active area of the tray.

Yet another element is needed to provide complete uniform activity on the tray. The liquid entering the tray often remains inactive through a substantial distance across the tray unless means is provided in its path to positively initiate bubbling activity. U.S. Pat. No. 3,282,576 to W. Bruckert describes a bubbling promoter, which when present at the tray inlet, increases momentarily the kinetic energy of the liquid — hence, reduces its hydrostatic head. Bubbling is initiated immediately at the tray threshold and once initiated, continues across the tray.

It has now been discovered that under certain conditions, the foregoing improvements in gas-liquid contact trays are inadequate to achieve full uniformity of fluid distribution. Even though inlet bubbling activity is insured and horizontal thrust equivalent to the liquid gradient is provided, severe maldistribution of fluids can occur and will significantly reduce tray efficiency. The phenomenon is frequently found in large diameter trays and is most acute at high vapor velocity. Moreover, the fluid maldistribution is more prone to occur at low than at high liquid loadings.

The result of liquid maldistribution under the foregoing conditions, on trays designed according to the Williams et al. and Bruckert patents is essentially the reverse of the effects noted when the Bruckert sloped surface bubbling promoter is absent. The tray liquid inlet area is now overactive and the liquid outlet area is relatively inactive. The liquid at the inlet is usually fluidized and is thrown in a trajectory reaching far down the tray. The bubbling activity at the outlet is low, and the heavy burden of dense, poorly-aerated liquid in this area "rains" profusely through the apertures to the tray below. The maldistribution of the fluids combined with the severe weeping reduces tray efficiency significantly below the high levels characterizing smaller trays of the prior art Williams et al. - Bruckert design.

The maldistribution of fluids on prior art trays designed in accordance with the Williams et al and Bruckert patents is illustrated in FIG. 1, which is a vertical cross-section through two adjacent trays 1 and 2 of the column. Liquid on receiving pan 3 of tray 1 flows over bubbling promoter 4 onto the active area of the tray. The over-aeration of the liquid is shown by the trajectory of very low density froth as it is thrown from the inlet far down the tray to about point 5. The low density fluid over the tray openings upstream of point 5 produces relatively little resistance to vapor flow through the tray in this region. As a consequence, an inordinately large fraction of the column vapor penetrates the tray near the inlet. Approaching the outlet, the liquid becomes less aerated and more dense, particularly in the tray part adjacent the active surface edge at the liquid outlet. The higher hydrostatic head in the outlet region 6 prevents vapor penetration and allows liquid leakage through the openings onto the tray below. The severe weeping 7 of liquid through the openings without sustained contact and mass exchange with rising gas further aggravates the already over-burdened condition on the outlet zone of the tray beneath. This weeping is far more severe in this particular tray part than adjacent the diametral streamline at the liquid outlet, a difference which cannot be seen in FIG. 1. Thus, much of the tray is ineffective and a significant fraction of the liquid escapes contact with the vapor. The result is a severe impairment of tray efficiency.

It should be noted that FIG. 1 is deliberately out-of-proportion in order to clearly show the non-uniformity in fluid depth across the tray. The shortened horizontal scale of FIG. 1 masks one aspect of the above-described problem which concerns the sheer size of the tray. A typical tray constructed according to this invention is 25 feet in diameter — a length as great as one of the foundation dimensions of many homes built today. Over this large tray area, it may be necessary to maintain an average hydrostatic head of 1-inch of column liquid, and the permissible variation from this average might be only 0.2 inch column liquid in order to avoid severe fluid maldistribution, instability and inefficiency.

The foregoing fluid maldistribution on large diameter trays is unexpected and the reason for it occurrence is by no means self-evident. Such maldistribution has been observed even when the overflow weir at the downcomer is removed entirely (as illustrated in FIG. 1). Reducing the effectiveness of the bubble promoter does not correct the problem. The fact that the maldistribution occurs at both low and high liquid loadings dissociates the phenomenon from the total fraction of the vapor energy employed to promote liquid flow, i.e., from the ratio of inclined openings to normal openings. One would expect that liquid gradient problems (resulting from different hydrostatic heads of liquid at the inlet and discharge ends) would be more prone to develop on large trays with extended liquid flow paths and high liquid loadings and that such gradient would tend to produce the opposite effect from that actually observed. That is, one would expect over-burdening the tray with liquid near the inlet and under-burdening the outlet with liquid.

It has been speculated that the cause of maldistribution on large trays is associated with the acute divergence and convergence of the liquid channel. At the tray inlet region, the liquid stream spreads as the channel widens and results in over-activity near the inlet. Thus, a disproportionately large amount of vapor passes through the inlet region of the tray as compared with the other regions of the tray. At the tray outlet region, the reverse effect occurs as the liquid channel narrows and the liquid stream deepens. As the hydrostatic head in the outlet region becomes greater than that in the inlet region, the vapor flow will preferentially be diverted toward the under-burdened inlet region. Reducing the vapor flow through the outlet region reduces the vapor thrust on the liquid in this region and the imbalance condition of gas and liquid is further aggravated. The condition worsens as the openings near the outlet become inactive in terms of liquid-gas mass exchange and the full potential head of clear liquid causes severe weeping.

An object of this invention is to provide an improved gas-liquid contact tray of the slotted sieve type characterized by improved distribution of liquid across the entire active tray surface.

Another object is to provide an improved slotted sieve type tray which eliminates the overactive liquid-gas contact of the liquid inlet area and the inactive liquid outlet area characteristic of very large diameter prior art slotted sieve trays.

Other objects and advantages of this invention will be apparent from the ensuing disclosure and appended claims.

SUMMARY

This invention relates to an improved gas-liquid contacting tray of the type used in distillation and absorption systems for mass transfer between the two fluids.

This invention relates in particular to a liquid-gas contacting tray of the slotted sieve type for effecting intimate contact between rising vapor and liquid flowing across the tray from a liquid inlet to a liquid discharge in which a multiplicity of band members are provided with main flat top and bottom surfaces and arranged with transverse edges of adjacent band members contiguously positioned transverse to liquid path and a plurality of fixed size openings distributed across such band members and extending therethrough with walls normal to the main flat top and bottom surfaces for gas flow. A plurality of elevated portions are formed from the band members across the surfaces each with an upper surface raised from said main flat top surface having a front leading edge separated from the main flat top surface to form an elongated slot opening therewith of greater width than height. The raised upper surface is inclined to said main flat top surface and has a back edge integral with such surface. Each elevated portion is spaced from adjacent elevated portions by the main flat top surface entirely surrounding such elevated portion, and each elevated portion is oriented with its back edge upstream of its slot opening with respect to the liquid flow path.

In one aspect of the invention, at least two adjacent band members are provided with a first upstream band member having relatively lower slot density across said surfaces and a second downstream band member having relatively higher slot density across said surfaces, the band member with a downstream edge at said liquid outlet having the highest slot density of all band members, and the average slot densities upstream and downstream the tray transverse centerline being such that $\lambda_2/\lambda_1$ is greater than 1 and less than 5 where $\lambda$ is defined by the equation $$\lambda = f_s C_s/f_s C_s + f_p C_p$$

where $f_s$ = total area of the slot openings expressed as a fraction of the active portion of a particular tray part $f_p$ = total area of the normal fixed size openings expressed as a fraction of the active portion of the same tray part $C_s$ = orifice coefficient of the slots $C_p$ = orifice coefficient of the normal fixed size openings, and where $\lambda_1$ is the tray part upstream of the tray transverse centerline and $\lambda_2$ is the tray part downstream of the tray transverse centerline. As used herein, the active portion of a particular tray part is the portion on which aeration occurs as described, for example, in the book *Design of Equilibrium Stage Process*, Chapter 15, "Tray Hydraulics Perforate Trays," edited by Buford D. Smith and written by James R. Fair, pages 542,549–552 and 556–559, McGraw-Hill (1963). The orifice coefficients Cs and $C_P$ are well understood in the art as described, for example, in the book *Unit Operations*, Chapter 13, "Measurement of Flow of Fluids," edited by George C. Brown, pages 157–160, John Wiley and Sons (1950).

In one preferred embodiment of this aspect of the invention, the $\lambda_2/\lambda_1$ ratio is between 1.2 and 2.5, and in another embodiment the $\lambda$ value for the band member with its downstream edge at the liquid outlet is less than 0.3 and preferably less than 0.2.

In still another embodiment the tray diameter is greater than 10 feet and has at least three band members with progressively higher slot densities in the direction of the liquid flow path.

This invention may be advantageously employed with either the simple single-pass type of tray wherein the liquid enters adjacent an outer edge and flows across the entire active surface in first a diverging pattern and then a converging pattern for discharge at the liquid outlet adjacent an outer edge opposite to the first mentioned outer edge. The liquid is then transferred by a downcomer to the next lower tray where it enters immediately below the outlet of the next above tray and flows across the active surface in the opposite transverse direction to that on the latter.

The invention will however be described in particular with respect to a parallel flow tray, and is preferably employed therewith because of its higher mass transfer efficiency than the simple single-pass type. A center baffle extends across the tray along the diameter thereof so as to divide the tray into two equal parts. Liquid inlet means are provided at the edge of one tray part immediately adjacent a first end of said center baffle for flow thereacross, with liquid outlet means immediately adjacent a second end of the center baffle at the opposite edge of the one tray part. Liquid inlet means are provided at the edge of the other tray part immediately adjacent the second end of the center baffle for flow thereacross in the opposite direction to the liquid path across said one tray part, with liquid outlet means immediately adjacent the first end of the center baffle at the opposite edge of the other tray part. Band members immediately downstream the liquid inlet members of the one and other tray parts preferably have only the fixed size openings and not the slot openings.

In another aspect of the invention, at least some of the slot openings in the tray part downstream the tray transverse centerline are angularly oriented with respect to the tray diametral streamline such that: (a) the slot angle of individual slots increases in the transverse direction to the liquid flow path from the diametral streamline to the tray outer edge, (b) the slot angle of individual slots also increases in the longitudinal direction of the liquid flow path to the liquid outlet, and (c) the slot angle of individual slots immediately adjacent the liquid outlet and the tray active surface outer edge at the point of intersection with said liquid outlet is within 20° of the angle formed by a tangent line at the point of intersection and the diametral streamline, and represents the maximum slot angle on said tray. Also in this aspect of the invention, a longitudinal part of the tray containing the diametral streamline and extending from the liquid inlet to the liquid outlet has only 0° slot angle. In a still more preferred aspect of the invention both the aforedescribed variable density slotting and angular slotting are employed.

BRIEF DESCRIPTION OF THE DRAWINGS

In the drawings:

FIG. 4 is a plan view of one-half of a slotted sieve tray showing sections of different degree slot vectors (angular slotting) in the liquid outlet quadrant.

FIG. 6 is an isometric view of a portion of an exemplary tray according to this invention, showing the relation between the fixed size openings with walls normal to the tray surface, and a slot with side walls forming acute angles with the tray surface, and FIG. 7 is a graph showing the relation between the hydrostatic pressure of fluid on the tray as a function of the liquid flow path length (from the inlet) for prior art slotted sieve trays having zero vector angle-uniform density slots, and trays of this invention.

DESCRIPTION OF THE PREFERRED EMBODIMENTS

Figure 2:
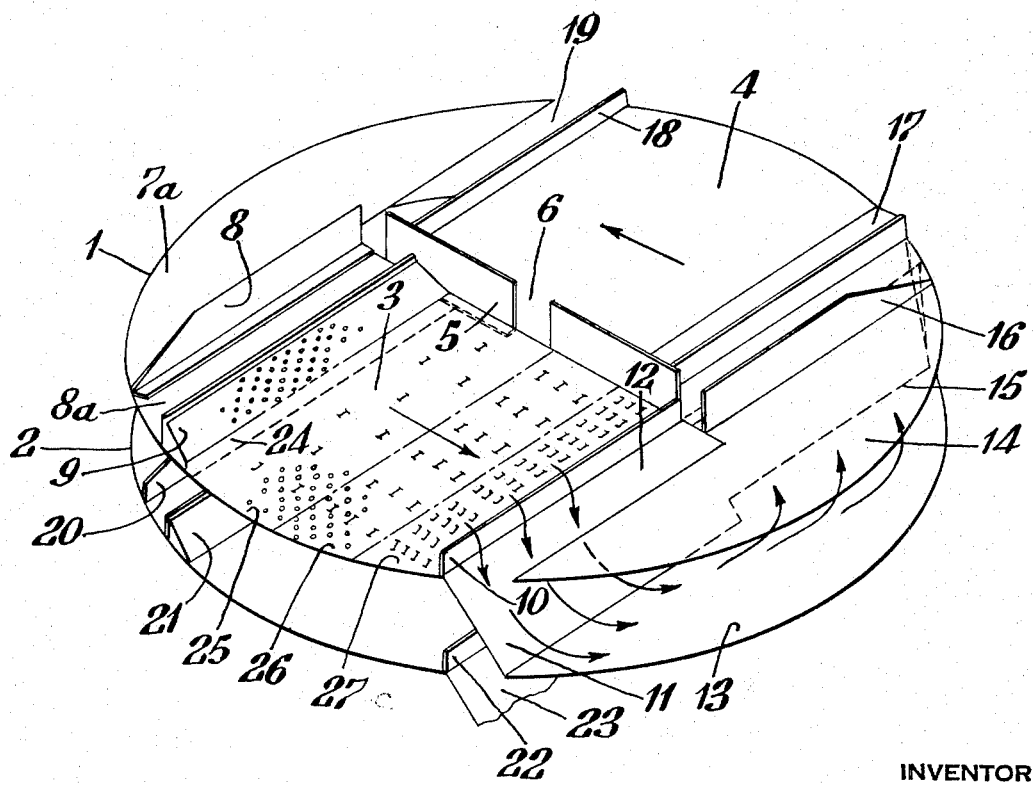
FIG. 2 is an isometric view looking downwardly on two variable slot density trays of this invention.

FIG. 2 illustrates an assembly of two adjacent trays 1 and 2 of a column embodying the present invention. The column walls have been omitted from the figure, but it is to be understood that the circular edges of the trays are sealed substantially leak-tightly against the vertical wall of the cylindrical column. The trays are of the parallel-flow type wherein the liquid flowing down the column is divided into two streams — one stream occupying one-half the tray and the other the opposite half. The paths of the two streams form a double helix because the liquid overflowing from each half of the tray crosses over in the downcomer and enters the next tray below on the opposite side of the column. A result of the double helical flow pattern is that liquid flow on one-half of a tray is in opposite direction to that on the other half, as indicated by arrows on the figure, and the inlet of one side of a tray is adjacent the outlet of the other side.

Thus, tray 1 is divided into half-tray 3 on which liquid flows forward and to the right in the figure, and half-tray 4 on which liquid flows away and to the left. The two streams are separated by diametral wall or center baffle 5 whose height is less than the tray spacing to achieve uniform gas distribution between adjacent half-trays. The opening 6 in the center of wall 5 serves to equalize th volumes and fluid depths of the two streams on the tray so that liquid imbalance cannot accumulate from tray to tray.

One-half of the liquid stream flowing down the column enters half-tray 3 from downcomer pan 7a by first flowing over preliminary weir 8 and then downwardly over sloped surface bubbling promoter 9. Preliminary weir 8 serves to distribute the liquid uniformly along the channel 8a between the preliminary weir and the bubbling promoter 9. This redistribution is highly desirable in the parallel-flow tray because the liquid turns 180° in the downcomer and momentum effects can otherwise produce unequal distribution of the stream along the crest of the bubbling promoter 9. The height and edge contour of the preliminary weir can be adjusted to suit the specific momentum effects of a particular downcomer. In the FIG. 2 embodiment, the outer end of preliminary weir 8 is tapered downwardly to induce relatively more liquid to enter the tray near the circumference and to avoid a liquid-deficient condition in that area.

Bubbling promoter 9 is a sloped weir with perforations only, on the sloped surface. Its form and function are in accordance with the aforementioned Bruckert et al. U.S. Pat. No. 3,282,576. Other bubble promoting means may be used at the liquid inlet, for example a lip-type restricted opening. The foam or froth created at promoter 9 flows across the main liquid-gas contact zone of half-tray 3, over outlet weir 10 and falls down sloped wall 11 of downcomer 12. Upon leaving the active area of the tray and entering the downcomer, the vapor disengages from the liquid and continues upward to the next tray above. The clear liquid flows around downcomer pan 13 and under a gate 14 cut-away from the lower edge 15 of sloped downcomer wall 11. The liquid thereby gains entry to the far half of tray 2 (beneath half-tray 4), and flows in succession over a preliminary weir, a bubble promoter and across a main liquid-gas contact zone similar to those elements on half-tray 3.

While one-half the column liquid is flowing over half-tray 3, the other half is flowing over half-tray 4. This other half of the column liquid flows in succession over preliminary weir 16, bubble promoter 17, and the main liquid-gas contact zone of half-tray 4. After traversing the contact zone, it overflows weir 18 into downcomer 19 and drops to the level of tray 2. It then crosses over to the near side of tray 2 and enters the half-tray immediately beneath half-tray 3, flowing in succession over preliminary weir 20, bubble promoter 21, the main liquid-gas contact zone, outlet weir 22, and sloped downcomer wall 23.

In contrast to the double-helical flow path of the liquid, the column vapor flows substantially straight upward from tray-to-tray. It is prevented from bypassing through the downcomer by the sloped wall 11 whose lower edge 15 is immersed beneath the stream of liquid.

It has been discovered that maldistribution of vapor and liquid on large diameter trays can be corrected by providing a modified pattern of slots which is non-uniform along the length of the liquid flow channel. In this invention, the slot density (slots provided per unit area) increases from substantially zero at the inlet to a maximum at the outlet. In actual practice, the increase in slot density need not be gradual but preferably occurs in steps, thereby greatly facilitating fabrication. In other words, the active area of the tray may be divided into bands extending transversely of the liquid flow channel, each band having a uniform slot density, but the slot density of each band being greater than that of an adjacent upstream band and less then that of an adjacent downstream band. The slot density of the first transverse zone or band adjacent the bubble promoter is preferably zero.

The greatest slot density occurs in the last transverse band with a downstream edge adjacent the liquid outlet, and preferably should be less than a value such that the λ-factor does not exceed 0.3. For best results this λ-factor should not exceed 0.2. As used herein, the λ-factor for a transverse band is the effective slot area of the band expressed as a fraction of the effective total open area of the band. It is defined by the equation $$\lambda = f_s\, C_s / f_s\, C_s + f_p\, C_p$$

where
$f_s$ = total area of slot openings expressed as a fraction of the active portion of the tray band
$f_p$ = total area of normal openings expressed as a fraction of the active portion of the tray band
$C_s$ = orifice coefficient of the slots
$C_p$ = orifice coefficient of the normal openings The λ-factor may also be described in terms of flow conducitivity. The product of the area of a set of openings, e.g., slots or perforations, and the orifice coefficient of those openings is a measure of the flow conductivity of such set of openings. Thus, the λ-factor denotes the fraction of the total flow conductivity of a tray transverse band which is contributed by, for example the slots, thus denoting the fraction of the total vapor flow through the band which is carried by the slots.

If the λ-factor of the outlet band exceeds 0.3, this band becomes prone to fluidization. Should this occur, then a disproportionate fraction of the vapor would penetrate this band and mass transfer in all upstream bands would suffer. In the extreme condition, portions of the upstream bands could become unstable and inactive and weeping might then occur in those portions.

It should be noted that the use of a non-uniform slot pattern increasing in density toward the downcomer cannot be explained or justified on the basis of normal hydraulic gradient as occurs in uniform width flow channels. In effect, normal gradient represents a conversion of potential head to kinetic energy and is a natural consequence of frictional resistance to liquid flow across the tray. Thus, hydraulic gradient produces a lower potential head at the tray outlet than at the inlet. It would appear inconsistent with the gradient model to provide greatest slot density and most vapor thrust in the outlet zone where hydrostatic head naturally tends to be lowest.

In the trays of diameter greater than 10 feet, there is preferably at least one band of intermediate slot density between the minimum slot density band adjacent the inlet and the maximum slot density band adjacent the downcomer. Any number of transverse bands varying in their respective slot densities may be provided, and in general, the more bands provided, the smaller will be the increments by which slot density increases from band to band. Preferably, at least two intermediate bands are provided.

FIG. 2 shows bands of differing slot densities as described above. The bands are represented by dashed or broken lines extending transversely across half-tray 3. The narrow, zero-slot band 24 is contiguous to the discharge edge of bubble promoter 9, followed by two intermediate slot density bands — 25 and 26. A final, maximum density band 27 is contiguous to the tray liquid outlet weir 10.

Figure 3:
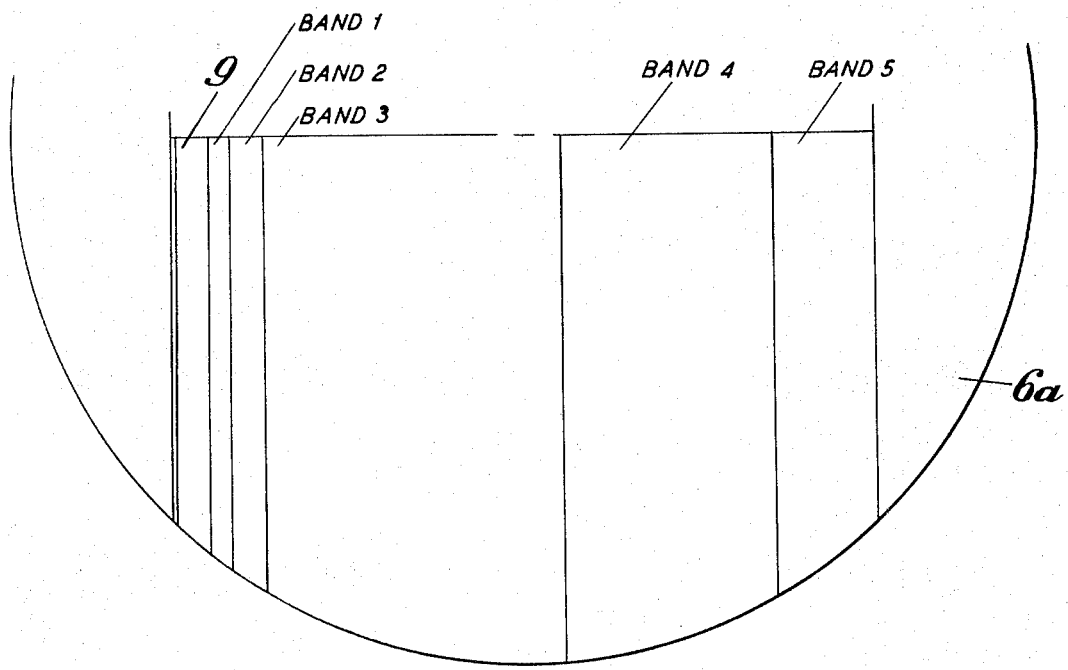
FIG. 3 is a plan view of one-half of the FIG. 2 tray in greater detail, showing the transverse bands of different slot densities.

FIG. 3 illustrates the non-uniform (variable) slot density bands of the present invention in greater detail. For this embodiment, the longitudinal dimension of the active tray area $L_{(max)}$ is 238 inches and begins at the crest of the bubble promoter. A first transverse band 6 inches wide (measured along the length of the flow path) immediately adjacent the bubble promoter contains no slots ($\lambda$ = zero) and its width represents 2.5 percent of the flow path. The last transverse band adjacent the downcomer is 36 inches wide (15 percent of the flow path) and is provided with 0.392 open slots per sq. in. ($\lambda$ = 0.093) or about 1.54 times the slot density of a uniformly slotted tray if designed for this particular liquid-gas flow system according to gradient-elimination considerations only pursuant to the Williams et al. patent.

Intermediate the first and last transverse bands are three additional bands of progressively increasing slot density (and λ-factor). The second band adjacent the first zero-slot density band is 11 inches wide (5 percent of the flow path) and contains 0.130 open slots per sq. in. ($\lambda$ = 0.03) or only about 0.50 times the slot density of the aforementioned uniform slot density tray. The third band, adjacent the second, is 103 inches wide (43 percent of the flow path) and contains 0.254 slots per sq. in. ($\lambda$ = 0.062) which is equal to the slot density of the same uniformly slotted tray. The fourth band, adjacent the third, is 72 inches wide (30 percent of flow path) and contains 0.284 open slots per sq. in. ($\lambda$ = 0.068), which is 1.12 times the slot density of a uniformly slotted tray. The $\lambda_2/\lambda_1$ ratio for the FIG. 3 embodiment is 1.4. The slot density in a particular transverse band need not be constant across the entire band. Where different densities are employed in a particular band, the aforedefined relationship of relatively lower and higher slot densities of first upstream and second downstream band members, respectively, refers to average slot densities.

Angular slotting also affords a significant improvement in the performance of large trays wherein divergence-convergence liquid flow path effects are severe due to the inherently higher liquid velocities. By "angular slotting" is meant the horizontal rotation of slots in the tray part downstream the tray transverse centerline (see line c—c of FIG. 4) such that they "point" inwardly toward the transverse center line. For the tray part upstream the tray diametral streamline "angular slotting" means horizontal rotation of the slots less than 15° slot angle away from the diametral streamline. By "diametral streamline" is meant the straight-line flow path of liquid from inlet to outlet, parallel to and approximately adjacent the column diameter (see line d—d of FIG. 4). Flow along the diametral streamline is remote from the cylindrical wall and is not appreciably deflected as a result of the diverging-converging channel. The vector of the slot, defined as a horizontal line normal to the width of the opening (see lines v—v of FIG. 4), is oriented so as to have a component in the transverse direction, i.e., in the direction of liquid convergence. Normally, the slot rotation should be at least sufficient to align the slot vector with the liquid streamline (flow path) upon which it lies. As usual herein, the expression "slot angle" refers to the included angle between slot vector and the diametral streamline.

It has been discovered that angular slotting is not needed in the tray part upstream the tray transverse centerline, i.e., the inlet quadrant of a parallel flow tray, and excessive angular slotting away from the diametral streamline, i.e., more than 15° is detrimental. In a preferred embodiment, the slot angle in this tray part is 0 degrees. However, beyond the midpoint of the flow path, the cylindrical wall of the column begins to invade the flow channel and narrows its width by rapidly increasing increments. However, liquid flowing into the tray part downstream the tray diametral streamline, i.e., the outlet quadrant of a parallel flow tray near the column wall at the tray outer edge is deflected inwardly toward the diametral streamline. This produces a transverse gradient and undesirably increases the hydrostatic pressure in the "corner" tray part near where the tray active surface outer edge intersects the liquid outlet (see point "p" in FIG. 4) of a 0-° slot angle tray. Frictional effects of the wall also tend to slow the flow of liquid in this "corner" tray part, and this aggravates the hydraulic gradient and further overburdens the "corner" of the active tray.

FIG. 4 is a plan layout of a tray with a pattern of angular slots appropriate for vacuum distillation of ethylbenzene and styrene. The tray deck is conveniently constructed from generally rectangular panels, and the slot density and orientation are usually held uniform throughout a given panel to facilitate fabrication. Just as the slot density changes abruptly from one transverse band to the next, the slot angle also changes abruptly at the borders between regions of specific slot orientation.

FIG. 4 shows that only the quadrant 30 of the tray toward the downcomer, hereinafter referred to as the liquid outlet quadrant, contains angular slotting. Moreover, within this quadrant 30, the slot angle with respect to the diametral streamline direction increases in the longitudinal direction of the liquid flow path to the liquid outlet and also increases proceeding transversely to the liquid flow path from the diametral streamline to the tray outer edge. The first parallel section 31 of the liquid flow path which contains the diametral streamline d—d extends all the way through the liquid outlet quadrant 30 to the liquid outlet 31a joining downcover 6a and is provided with zero-angle straight slots parallel to the diametral streamline. The width of this parallel section (40 inches) comprises about 23 percent of the full, maximum width (177 inches) of the flow channel.

The second parallel section of the flow path, adjacent the first, is divided into an upstream part 32 comprising about two-thirds of the length of the section and a downstream part 33 comprising the remaining one-third of the length. In the upstream part 32 of the second flow path section, the slots are rotated inwardly toward the diametral streamline d—d so that their vectors lie at a slot angle of 12.5° to a 0-° slot vector. In the downstream part 33 of the second flow path section, the slots are rotated in the same direction to a slot angle of 25° to a 0-° slot vector. The width of the second parallel section (60 inches) comprises about 34 percent of the full, maximum width (177 inches) of the flow channel.

The third parallel section adjacent the second, is also divided into an upstream part 34 (two-thirds of its length) and a downstream part 35 (one-third of its length). In the upstream part 34, the slots are rotated inwardly toward the diametral streamline so that their vectors lie at a slot angle of 25 to a 0-° slot vector. In the downstream part 35, the slot vectors are 40° slot angle to a 0-° slot vector. Part 35 is the aforedescribed "corner" of the tray. The width of the third parallel section (74.4 inches) comprises about 42 percent of the full, maximum width (177 inches) of the flow channel.

It will be noted that the arrows denoting slot-vector direction on FIG. 4 are approximately aligned along imaginary streamlines which would exist in the converging liquid stream. Proceeding transversely from the tray active surface outer edge toward the 0-° angle diametral streamline d—d, it is seen that in the tray part 35 immediately adjacent or near the outer edge at the intersection point p with the liquid outlet 31a, the slot angle of 40° is substantially the same as the angle formed by tangent line t—t at the point of intersection p and diametral streamline d—d. However, according to this invention, the slot angle of the tray corner part 35 is within 20° of the angle formed by tangent line t—t and diametral streamline. For example, if this last mentioned angle is 40°, the slot angle of tray corner part 35 may be between 20° and 60°, and still provide the liquid flow direction necessary to improve the liquid distribution in tray part 30 downstream transverse centerline c—c. In tray parts lying between tray part 35 and 0-° slot angle tray part 31, the slot angle is intermediate the tangent angle and the 0-° angle.

Considerable freedom can be exercised in sizing and locating the areas of specific vector rotation and in choosing the angles for vector rotation. Providing a larger number of diverse areas will permit finer tuning of the design but will increase fabricating costs. Fewer diverse areas will tend toward less precise control of the transverse gradient and toward poorer performance. The advantages of the angular slotting aspect of this invention may be realized by providing as few as two different parts in the outlet quadrant 30 in terms of different slot angles. For example, referring to FIG. 4 the tray part between dashed line x—x and the tray outer edge may be provided with slots having at least 20° and the tray part betwen line x—x and the tray diameter may have 0-° slot angle. In general, the latter would constitute the larger portion of the active surface of the liquid outlet quadrant 30, and the line x—x may be displaced closer to the outer edge by increasing the slot angle in the tray part terminating in such edge.

In a preferred embodiment, the inlet quadrant has zero degree slot angle throughout and the liquid outlet quadrant comprises three parts of different slot angle each comprising at least 5 percent of the outlet quadrant active area. A first part extending the entire longitudinal flow path of this quadrant and encompassing the diametral streamline has zero slot angle and comprises less than 50 percent of the quadrant total active area. A second tray part is bounded on the outside by the liquid outlet and the tray outer edge and has the highest slot angle in the outlet quadrant. This slot angle is within 20° of the angle formed by a tangent line at the aforementioned point of intersection and the diametral streamline. The third tray part comprising the balance of the liquid outlet quadrant has a slot angle greater than 10° and at least 10° less than the slot angle in the second tray part.

FIG. 2 ilustrates a downcomer 12 which has a sloped wall 11 extending down to pan 13. Pan 13 is at uniform elevation throughout the downcomer. Liquid flowing around the pan, under gate 14 and onto the next tray tends to favor the shortest route, i.e., liquid preferentially flows onto the next tray near the innermost end of the bubble promoter adjacent the center baffle 5. Without liquid flow adjusting means at the inlet, the outermost end of the promoter near the column wall receives an insufficient part of the inflowing liquid. In effect, a gradient would be established along the tray inlet with maximum potential head adjacent the center baffle 5 and with minimum head adjacent the column wall. This liquid inlet flow maldistribution is avoided in the sloped downcomer 9 embodiment of FIG. 2 by means of the preliminary weirs 8 and 16 whose contour is chosen to reduce the potential head of liquid at the center baffle 5 relative to that at the column wall.

Figure 5:
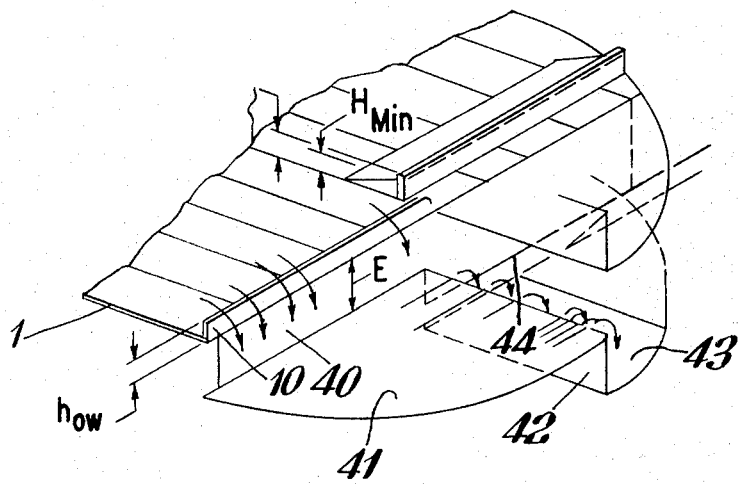
FIG. 5 is an isometric view looking downwardly on a stepped downcomer construction which may be used with the instant trays.

FIG. 5 illustrates an alternative downcomer arrangement for a split flow tray comprising a stepped downcomer featuring two descending levels of the receiving pan. Liquid leaving tray 1 falls down wall 40 onto pan 41 at the upper level of the downcomer. After turning 90°, the liquid falls again down wall 42 onto pan 43 at the lowest level in the downcomer. It then flows under gate 44 and onto the next tray.

FIG. 6 illustrates a preferred slot-normal opening construction which may be used to form variable slot density and angular slot trays according to this invention. Situated on main flat surface 110 are a number of fixed size openings or perforations 113 normal to surface 110 and extending through the tray 115. Also on the main flat surface 110 are a number of elevated portions formed from the tray having a top surface 112 inclined to the main flat surface 110 and integral therewith. These elevated portions also have sides 111 which are also inclined to the main flat surface 110 and integral therewith. The top surface 112 and the inclined sides 111 have leading edges 112a and 111a respectively above the main flat surface 110. The flat surface just below leading edge 112a and the leading edges 111a of inclined sides 111 are situated such that they form an aperture or slot 114 having an aperture plane which may be normal to the main flat surface 110 or slightly inclined thereto, depending upon the manner in which the elevated portions are initially formed.

In operation, a process vapor or gas flows only through perforations 113 and slot 114. The portion of the vapor passing through the perforations 113 normal to the tray surface 110 proceeds through a process liquid contained on the tray and forms bubbles while passing through the process liquid. In this manner intimate contact between the liquid and vapor is achieved. The vapor passing through slot 114 does not leave the surface of the tray normal thereto as does the vapor passing through perforations 113. Instead, the vapor impinges on the underside of slot top surface 112 and is directed obliquely into the process liquid. In this manner the underside surface acts as a gas flow directing surface. It should also be noted that the slot opening 114 functions as a throat, i.e., it converts pressure drop to kinetic energy. The kinetic energy or vapor thrust associated with this portion of the vapor is at an angle to the tray surface 110. This inclined force vector may then be resolved into its horizontal and vertical components. The horizontal component is directed into and absorbed by the process liquid thereby causing the process liquid to flow in the direction 124.

The sizes of perforations 113 and slots 114 depend on the flow requirements for a particular liquid-gas system, as will be understood by those skilled in the distillation art. For example, perforation diameters of 0.015 to 0.125 inch are satisfactory for air separation, but larger diameters up to about 0.25 inch may be preferred for other gas-liquid systems. The perforations are most conveniently formed by punching holes through a metal sheet, and for mechanical reasons sheet metal cannot be thicker than the punched hole diameter. Perforations of diameter smaller than 0.015 inch will therefore necessitate the use of a tray material which is too thin to provide level support for the liquid. A further disadvantage also results if the perforation diameter is less than 0.015 inch, i.e., the pressure drop across trays becomes inordinately high and power losses increase. On the other hand if the perforations are excessively large in diameter, normal vapor loadings would be insufficient to keep the tray from weeping thereby reducing tray efficiency. Although the perforations 113 need not be of circular cross-section, this configuration is preferred from the standpoints of manufacturing ease and minimum pressure drop.

In many instances, only perhaps 10 percent to 20 percent of the total open area on the tray need be provided as slots, the balance being normal perforations in standard sieve material.

Since the total open area is usually a small fraction (e.g. 10 percent) of the total tray surface, it is clear that a total slot area on the order of 1 percent to 2 percent of the tray surface will often be adequate to neutralize the hydrostatic gradient.

For satisfactory performance, the slots and perforations are sized to exhibit a wet tray pressure drop ($\Delta h_w$) between 0.05 and 0.5 inch of column liquid. As used herein "wet tray pressure drop" is the resistance to vapor flow through the slots or perforations due to surface tension of the liquid at incipient bubbling conditions, exclusive of hydrostatic head. For best performance, $\Delta h_w$ for the slots should be somewhat less than for the perforations and preferably should be between 70 percent and 100 percent of the $\Delta h_w$ for the perforations.

The trays of this invention are preferably manufactured by first punching uniformly sized circular perforation openings through a sheet member, preferably in a uniform distribution pattern across the sheet top and bottom surfaces. Next, the perforated sheet is cut into band members of the desired shape and size. Discrete rectangular portions of the perforated band members are deformed therefrom by the application of force to one surface of such members so that the portions are elevated from the main level of the opposite surface which now becomes the main flat top surface of the tray band. Each of these elevated portions is entirely surrounded by the main flat top surface, and each has a raised top surface inclined obliquely to the main flat top surface. A front edge is then sheared from each elevated portion to form an elongated aperture plane, i.e., slot of greater width than height, containing the edges of the sheared material. As previously discussed, all of the elevated portions and slots of a particular band member are preferably oriented in the same direction and are formed at the same density across the band area. The slot orientation and density for different bands of course vary in accordance with this invention. The bands are then assembled in the desired tray pattern, outer edges of adjacent band members are contiguously positioned transverse to the liquid paths on opposite sides of the center baffle, and mechanically joined.

A calculated comparison of the present invention with the straight and uniformly slotted Williams et al. - Bruckert et al. tray has been made on a typical tray in an ethyl-benzene-styrene separation column comprising 72 trays. Tray No. 59 was chosen for the comparison, eight trays above the feed point and 13 trays below the top of the column.

The column is 29-½ feet in diameter and the trays are the parallel-flow type. The length of the liquid flow path across the tray from the sloped surface bubble promoter to the outlet is 20 feet and the active area of the tray is 543 feet squared. The bubble promoter is 1-¼ inches high with a 10° slope and with 12 percent free area provided as 0.1875 inch diameter openings normal to the tray surface. No outlet weir is provided. The downcomer is the stepped-type of FIG. 5 and employs baffle 35 at the lowest level instead of a preliminary weir.

At tray 59, the pressure is about 1.4 psia (72.4 mm Hg) and the temperature 160° F (71° C.). The liquid flow rate is 2.66 cu. ft/sec. which produces an inlet loading per unit length of the bubble promoter ($Q_L/b$) of 0.124 cu. ft/sec. × ft. The vapor load is 7,450 cu. ft/sec. producing a velocity based on the active area of the tray of 13.6 ft/sec. The tray is constructed of 0.105 in. thick sheet metal uniformly perforated with 0.1875 in. diameter holes thus providing a gross perforation area which is 15.07 percent of unit area on the active surface. Some of the tray openings are blocked by support framing under the tray, so that the average perforation open area for the entire active area is 12.84 percent. Each slot opening has a height of 0.084 inch, a base width of 0.62 inch and an area of 0.0386 inches squared. The slot is formed from sheet metal of the tray, which is inclined upwardly to the opening over a base length of 0.57 in. measured normal to the plane of the opening and along the flat surface of the tray.

The results of this calculated comparison are shown in FIG. 7 which is a plot of $\alpha_T h_f^*$ (*$\alpha_T$ (unitless) = volumetric fraction of liquid in the froth; $h_f$ (inches) = height of froth) the hydrostatic pressure of the fluid on the tray (as ordinate) against distance along the liquid flow path from the inlet (as abscissa). Curve A is the straight and uniformly slotted Williams et al. - Bruckert et al. tray provided with 0.254 slots per square inch. ($\lambda$ = 0.062) over the entire active tray area. This density of slots is that required to provide horizontal vapor thrust against the liquid in the direction of the downcomer just sufficient to balance the frictional resistance to liquid flow. Stated otherwise, the slot density is (theoretically) adequate to cancel the natural liquid gradient.

Curve B is the same tray provided with the nonuniform (variable) slot density of the present invention. The pattern of slot variation is a combination of those patterns shown in FIGS. 3 and 4. Specifically, the various transverse bands comprising the 240 inch long flow path are defined in Table I, beginning with band 1 adjacent the bubble promoter:

TABLE I

| Band | λ | Width Inches | % of flow path | Slot Density Open Slots/in² | Ratio of Slot Density to Slot Density for Curve A |
|---|---|---|---|---|---|
| 1 | 0 | 6 | 2.5 | 0 | 0 |
| 2 | .03 | 4.6 | | 0.130 | 0.51 |
| 3 | 0.062 | 103 | 43.0 | 0.254 | 1.00 |
| 4 | 0.068 | 72 | 30.0 | 0.284 | 1.12 |
| 5 | 0.093 | 36 | 15.0 | 0.392 | 1.54 |

Curve A shows why the zero angle, uniform density slotting pattern of the Williams et al. - Bruckert et al. tray causes hydraulic problems. The average value of $\alpha_T h_f$ for the entire flow path calculated to be 0.97 inches of tray liquid and the average deviation from this norm along the flow path is 17 percent. Moreover, the greatest variation below the norm near the inlet is 18 percent and the greatest above the norm near the outlet is 36 percent. The difference between the maximum and minimum values of $\alpha_T h_f$ is 0.53 inches of tray liquid or 55 percent of the norm.

In contrast, Curve B shows substantially less deviation. The average value of $\alpha_T h_f$ for the overall flow path is 0.93 inches and the average deviation from this norm is 11 percent. The greatest variation below this norm near the inlet is 13 percent and the greatest above the norm near the outlet is 23 percent. The difference between the maximum and minimum values of $\alpha_T h_f$ is 0.33 inches of tray liquid or 35 percent of the norm.

It is obvious from the shape of Curve B that the hydrostatic pressure on the tray is still not uniform. Further adjustment of the slot densities among the transverse bands would produce still more improvement, i.e., the slot densities of the intermediate bands might be additionally reduced and the densities of bands near the outlet further increased. Nevertheless, experience has shown that the improved hydrostatic pressure profile obtained by varying the slot density as described for Curve B is sufficient to obtain excellent tray performance, whereas the profile obtained with uniform slotting (Curve A) corresponds to poor performance for this very large diameter tray.

Curve C illustrates the improvement in liquid distribution obtained by varying the slot angle in the outlet quadrant of the tray as previously described but with uniform slot density. The slot vector angles and the pattern of angular slot distribution is in accordance with FIG. 4. Specifically, a 40 inch wide section 31 adjacent the column diameter contains slots of zero-vector rotation and extends the entire longitudinal flow path of the liquid. The tray section 35 contiguous to the liquid downcomer and column wall at the point of their intersection contains slots of 40° vector rotation. All other tray sections 32–34 within the 108 inch outlet quadrant 30 of the tray contain slots whose vector rotation is between 0° and 40°. Both tray section 34 upstream section 35, and the tray section 33 at the liquid outlet have 25° vector rotations, whereas tray section 32 upstream section 33 and contiguous to zero vector rotation section 31 has a 12-½° vector rotation.

It would appear from a comparison of Curves A, B and C that the improvement obtained with angular slotting is marginal. However, it should be noted that the profiles plotted in FIG. 7 represent hydrostatic pressure conditions along the median streamline of the active area. As used herein "median streamline" is that streamline which bisects all transverse distances between the column diameter and the column wall, including the length of the sloped surface bubble promoter and the outlet edge over which the liquid falls. It is evident therefore that the hydrostatic profile Curve A along this median streamline does not represent the worst condition on the uniformly slotted tray because it does not pass through the "corner" section surrounding the intersection of the downcomer with the column wall. For similar reasons, Curve C does not reflect the maximum corrective effect obtained by angular slotting because the median streamline does not pass through the section of maximum slot rotation. A much wider separation of Curves A and C would result if a streamline nearer the column wall were chosen.

The improvement obtained by angular slotting (Curve C) is not sufficient to completely eliminate the hydraulic problems observed in very large diameter trays. There is still too much imbalance between the inlet and outlet hydrostatic heads. Nevertheless, angular slotting does improve the hydrostatic profile to some degree and will reduce the extent of fluidization at the inlet and the extent of liquid weeping at the outlet.

Curve D shows performance using both variable density slotting and angular slotting. The tray of Curve D represents a combination of FIG. 2 and FIG. 4, and employs the slot densities, rotations and patterns shown on those Figures. The combination provides best performance of all the arrangements studied. It is seen that the improvement of Curve D over Curve B is qualitatively and quantitatively similar to the improvement of Curve C over Curve A. Note that the inlet and outlet are in near-perfect balance in the tray of Curve D. For both Curves B and D, leveling and reducing the liquid burden over the outlet results in the reactivation of this zone and in the accommodation of an appropriate share of the vapor flow through such zone. This reduces the vapor flow through the inlet zone and eliminates fluidization at the inlet.

The improvements afforded by embodiments of this invention have been demonstrated in full sized columns used for ethylbenzene-styrene separation under vacuum pressure. All three columns employed slotted sieve trays of the type illustrated in FIG. 6, and the sloped surface bubble promoter of FIG. 2. Column 1 employed the 0° slot vector (straight) slots at uniform density, column 2 employed straight slots at variable density, and column 2 used angular slots at variable density above the liquid feed point and straight slots at uniform density below the liquid feed point. Table II summarizes the performance data for the three columns.

The efficiency data in the foregoing Table II is not precisely comparable because the fluid loading per unit area of the trays was not equal and the liquid loading relative to the vapor loading was also different. However, the range defined by the column 2 and 3 results (characteristic of this invention) brackets the column 1 data characteristic of the Williams et al. - Bruckert et al. tray. Factors which can be compared directly are the ratios of observed-to-calculated values for theoretical tray counts and for tray efficiency. These ratios show how the present invention affords substantially more efficient slotted sieve trays for very large diameter columns.

Column 1 contains zero-vector angle/uniform density slotted trays throughout and column 2 contains zero-vector angle/variable density slotted trays throughout. Therefore, the performance of trays both above and below the feed points in these two columns offer a means of comparing these two slot patterns. Column 3 contains zero-vector angle/uniform density slotted trays below the feed point and angular slot/variable density trays above the feed point. This change in slot pattern must be considered when comparing the two sets of trays with corresponding sets in the other columns.

First comparing the efficiency of columns 1 and 2, it is readily apparent that a variable density slot pattern as used in column 2 is highly beneficial. Variable slot density shows an advantage in observed efficiency of 25 percentage points below the feed, 33 percentage points above the feed and 28.1 percentage points overall. Moreover, the column efficiency is predictable with poor accuracy for the prior art trays of column 1, but with excellent accuracy for the variable slot density trays of column 2. A comparison of theoretical tray counts for the two columns is correspondingly impressive. The larger number of theoretical trays observed in column 2 means that substantially fewer actual trays of the variable slot density type of this invention are required to obtain products of given purity.

With respect to column 3, it is seen that the section below the feed shows the same observed efficiency and theoretical tray count as the corresponding section in column 1, which is expected since the trays are both of the zero-vector angle/uniform density type. However, the upper section containing the angular slot/variable density tray type of this invention shows far higher observed efficiency than corresponding sections in either

TABLE II

| Item | Column number | | |
|---|---|---|---|
| | 1 | 2 | 3 |
| Column diameter, inches | 354 | 366 | 354 |
| Feed rate, lb./hr | 93,460 | 83,995 | 126,900 |
| Top vapor rate, lb./hr | 571,040 | 383,930 | 594,100 |
| L/D | 13.25 | 7.1 | 9.23 |
| Actual trays: | | | |
| Total | 72 | 70 | 72 |
| Above feed | 21 | 24 | 21 |
| Below feed | 51 | 46 | 51 |
| Slotting: | | | |
| Above feed | St.*/Un.** | St./Var.*** | Ang./Var. |
| Below feed | St./Un. | St.Var. | St./Un. |

| | Observed | Calcd. | Observed | Calcd. | Observed | Calcd. |
|---|---|---|---|---|---|---|
| Theo. trays: | | | | | | |
| Total | 43.5 | 60.6 | 62.0 | 63.1 | 52.2 | 68.2 |
| Above feed | 3.5 | 14.6 | 17.5 | 20.0 | 17.5 | 20.0 |
| Below feed | 35.0 | 46.0 | 43.0 | 43.1 | 35.0 | 48.2 |
| Column efficiency, percent: | | | | | | |
| Total | 60.5 | 84.2 | 88.6 | 90.1 | 73.0 | 94.7 |
| Above feed | 40.5 | 69.5 | 73.0 | 83.3 | 83.5 | 95.2 |
| Below feed | 69.0 | 90.1 | 94.0 | 93.7 | 69.0 | 94.5 |
| Observed efficiency/calcd. efficiency: | | | | | | |
| Total | | 0.72 | | 0.98 | | 0.77 |
| Above feed | | 0.58 | | 0.88 | | 0.88 |
| Below feed | | 0.76 | | 1.00 | | 0.73 |

*Straight (0° slot vector) slots.
**Uniform density slots.
***Variable density slots.

of the other columns (10.5) percentage points higher than column 2). Moreover, this efficiency was predicted with accuracy equal to the corresponding column 2 section. Although the observed numbers of theoretical trays in the upper sections of columns 2 and 3 are the same (17.5), it will be noted that these theoretical trays were obtained with only 21 actual trays in column 3 in contrast to 24 actual trays in column 2. It is evident therefore that the combination of angular slots and a variable density slot pattern achieves a still further significant improvement in the performance of very large diameter trays. The advantages of this invention were also qualitatively illustrated in a test column using air as the upwardly flowing gas and water as the downwardly flowing liquid. The column was 96 inches in diameter and the trays were the parallel-flow type withonly one side used for the tests. All trays were the slotted sieve type, some having uniform slot pattern and others having the variable slot density characteristics of this invention. All trays had 0° slot angle. The free area of the perforations was 10 percent of the total free area and was provided as 3/16-inch diameter holes normal to the tray surface. The slot opening had a height of 0.084 inch, a base width of 0.543 inch and an area of 0.0386 square inch. Windows were provided in the side of the column to observe the performance of each tray.

The trays of the above test column constructed according to this invention had three transverse flow bands, the upstream band immediately below the sloped surface bubble romoter being 6 inches wide and having a λ-value of zero (no slots). The intermediate band was 36 inches wide and had a λ-value of 0.048. The downstream band was 14 inches wide with a λ-value of 0.077. The column was operated at liquid flow rates ($Q_L/b$) of between 0.075 and 0.15 cu. ft. water/sec. × feet inlet weir. The air flow rate was between 0.2 and 0.35 ft./sec. as calculated by the formula $$F = V_s (\rho_V/\rho_L - \rho_V)$$

where
$V_s$ = vapor velocity based on the active tray surface area, ft./sec.
$\rho_V$ = vapor density, lb./cu. ft.
$\rho_L$ = liquid density, lb./cu. ft.

Figure 1:
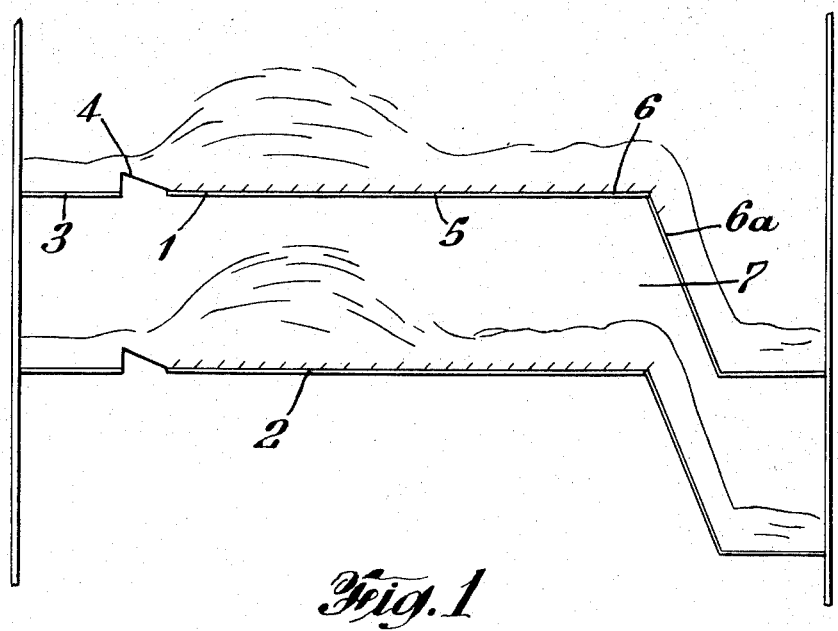
FIG. 1 is a cross-section view taken in elevation of two prior art slotted sieve trays in a large diameter column, showing the fluid maldistribution problem overcome by this invention.

It was observed that the trays without variable density slotting behaved in the manner illustrated in FIG. 1, whereas the variable density slotted trays under the same operating conditions showed uniform bubbling activity across the entire tray area.

Although preferred embodiments of this invention have been described in detail, it is contemplated that modifications of the apparatus may be made and that some features may be employed without others, all within the spirit and scope of the invention.

What is claimed is:

1. In a circular edged liquid-gas contacting tray of the slotted sieve-type for effecting intimate contact between rising vapor and liquid flowing across the tray in a diverging-converging pattern from a liquid inlet at one outer edge to a liquid discharge at an opposite outer edge in which a multiplicity of band members are provided with main flat top and bottom surfaces and arranged with outer edges of adjacent band members contiguously positioned transverse to liquid path and a plurality of fixed size openings uniformly distributed across such band members and extending therethrough with walls normal to said main flat top and bottom surfaces for gas flow, and a plurality of elevated portions formed form said band members across said surfaces each with an upper surface raised from said main flat top surface having a front leading edge separated from said main flat top surface to form an elongated slot opening therewith of greater width than height, the raised upper surface being inclined to said main flat top surface and having a back edge integral with such surface and each elevated portion being spaced from adjacent elevated portions by said main flat top surface entirely surrounding such elevated portion, and each elevated portion being oriented with its back edge upstream of its slot opening with respect to the liquid flow path, the improvement comprising: at least two adjacent band members with a first upstream band member having relatively lower slot density across said surfaces and a second downstream band member having relatively higher slot density across said surfaces, the band member with a downstream edge at said liquid outlet having the highest slot density of all band members, and the average slot densities upstream and downstream the tray transverse centerline being such that $\lambda_2/\lambda_1$ is greater than 1 and less than 5 where λ is defined by the equation $$\lambda = f_s C_s / f_s C_s + f_p C_p$$

where
$f_s$ = total area of the slot openings expressed as a fraction of the active portion of a particular tray part
$f_p$ = total area of the normal fixed size openings expressed as a fraction of the active portion of the same tray part
$C_s$ = orifice coefficient of the slots
$C_p$ = orifice coefficient of the normal fixed size openings, and where λ is the tray part upstream of the tray transverse centerline and $\lambda_2$ is the tray part downstream of the tray transverse centerline.

2. A tray according to claim 1 in which $\lambda_2/\lambda_1$ is between 1.2 and 2.5

3. A tray according t claim 1 in which λ for the band member with its downstream edge at the lquid outlet is less than 0.3.

4. A tray according to claim 1 in which λ for the band member with its downstream edge at the liquid outlet is less than 0.2.

5. A tray according to claim 1 in which the tray diameter is greater than 10 feet and with at least three band members having progressively higher slot densities in the direction of the liquid flow path.

6. A tray according to claim 1 of the parallel flow type with a center baffle extending from edge to edge of said tray along the diameter thereof so as to divide the tray into two equal parts; liquid inlet means at the edge of one tray part immediately adjacent a first end of said center baffle for flow thereacross, and liquid outlet means immediately adjacent a second end of said center baffle at the opposite edge of said one tray part; liquid inlet means at the edge of the other tray part immediately adjacent said second end of said center baffle for flow thereacross in the opposite direction to the liquid path across said one tray part, and liquid outlet means immediately adjacent said first end of said center baffle at the opposite edge of said other tray part; and band members immediately downstream said liquid inlet members of said one and other tray parts having only said fixed size openings and not having said slot openings.

7. A tray according to claim 1 in which at least some of the slot openings int the tray part downstream the tray transverse centerline are angularly oriented with respect to and toward the tray diametral streamline such that: (a) the slot angle of individual slots increases in the transverse direction to the liquid flow path from the diametral streamline to the tray outer edge, (b) the slot angle of individual slots also increases in the longitudinal direction of the liquid flow path to the liquid outlet, and (c) the slot angle of individual slots immediately adjacent said liquid outlet and the tray active surface outer edge at the point of intersection with said liquid outlet is within 20° of the angle formed by a tangent line at said point of intersection and said diametral streamline, and represents the maximum slot angle on said tray; less than 15° slot angle of said slot openings in the tray part upstream the tray transverse centerline and away from the diametral streamline; and a longitudinal part of said tray containing the diametral streamline and extending from the liquid inlet to the liquid outlet having 0° slot angle.

8. A tray according to claim 7 in which the slot angle of all slot openings in the tray part upstream the tray transverse centerline is 0°.

9. In a circular edged liquid-gas contacting tray of the slotted sieve-type for effecting intimate contact between rising vapor and liquid flowing across the tray in a diverging-converging pattern from a liquid inlet at one outer edge to a liquid discharge at an opposite outer edge in which a multiplicity of band members are provided with main flat top and bottom surfaces and arranged with outer edges of adjacent band members contiguously positioned transverse to liquid path and a plurality of fixed size openings uniformly distributed across such band members and extending therethrough with walls normal to said main flat top and bottom surfaces for gas flow, and a plurality of elevated portions formed from said band members across said surfaces each with an upper surface raised from said main flat top surface having a front leading edge separated from said main flat top surface to form an elongated slot opening therewith of greater width than height, the raised upper surface being inclined to said main flat top surface and having a back edge integral with such surface and each elevated portion being spaced from adjacent elevated portions by said main flat top surface entirely surrounding such elevated portion, and each elevated portion being oriented with its back edge upstream of its slot opening with respect to the liquid flow path, the improvement comprising: angular orientation of at least some of said slot openings in the tray part downstream the tray transverse centerline and with respect to and toward the tray diametral streamline such that: (a) the slot angle of individual slots increases in the transverse direction to the liquid flow path from the diametral streamline to the tray outer edge, (b) the slot angle of individual slots also increase in the longitudinal direction of the liquid flow path to the liquid outlet, and (c) the slot angle of individual slots immediately adjacent said liquid outlet and the tray surface outer edge at the point of intersection with said liquid outlet is within 20° of the angle formed by a tangent line at said point of intersection and said diametral streamline, and represents the maximum slot angle on said tray; less than 15° slot angle of said slot openings in the tray part upstream the tray transverse centerline and away from the diametral streamline; and a longitudinal part of said tray containing the diametral streamline and extending from the liquid inlet to the liquid outlet having 0 degree slot angle.

10. A tray according to claim 9 in which the slot angle of all slot openings in the tray part upstream the tray transverse centerline is 0°.

* * * * *